(12) United States Patent
Song (10) Patent No.: US 10,865,842 B2
(45) Date of Patent: Dec. 15, 2020

(54) ELECTRONIC DISC BRAKE

(71) Applicant: MANDO CORPORATION, Pyeongtaek-si (KR)

(72) Inventor: Joon-Kyu Song, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 15/900,225

(22) Filed: Feb. 20, 2018

(65) Prior Publication Data

US 2018/0238408 A1   Aug. 23, 2018

(30) Foreign Application Priority Data

Feb. 21, 2017   (KR) .................. 10-2017-0022826

(51) Int. Cl.
*F16D 121/24*   (2012.01)
*F16D 65/18*   (2006.01)
(Continued)

(52) U.S. Cl.
CPC .......... *F16D 65/18* (2013.01); *F16D 2121/14* (2013.01); *F16D 2121/24* (2013.01);
(Continued)

(58) Field of Classification Search
CPC ............. F16D 2121/24; F16D 2125/40; F16D 2125/50; F16D 2125/52
(Continued)

(56) References Cited

U.S. PATENT DOCUMENTS 6,305,508 B1 * 10/2001 Schumann ............ B60T 13/741
188/72.8
7,021,415 B2 * 4/2006 Farmer .................. B60T 13/741
180/275
(Continued)

FOREIGN PATENT DOCUMENTS

CN   1761597 A   4/2006
CN   201626311 U   11/2010
(Continued)

OTHER PUBLICATIONS

Office Action issued in corresponding Chinese Application No. 201810153583.X, dated Mar. 12, 2019.
(Continued)

*Primary Examiner* — Thomas W Irvin
(74) *Attorney, Agent, or Firm* — Morgan, Lewis & Bockius LLP (57) ABSTRACT

Disclosed herein is an electronic disc brake. The electronic disc brake according to one embodiment of the present disclosure includes a disc configured to be rotated with a wheel, a caliper housing configured to operate pad plates installed at both sides of the disc, and an actuator including a piston provided in the caliper housing and configured to press the pad plates to bring the pad plates into contact with the disc, a spindle rotatably installed in the caliper housing to move the piston forward and backward, a motor configured to rotate the spindle, and a speed reduction apparatus configured to transmit a rotational force of the motor to the spindle, wherein the speed reduction apparatus includes a power connecting unit connected to the motor, a bracket provide above the motor and configured to support the power connecting unit, and a speed reduction gear unit configured to sequentially connect the power connecting unit and the spindle.

11 Claims, 6 Drawing Sheets

(51) Int. Cl.
*F16D 121/14* (2012.01)
*F16D 125/40* (2012.01)
*F16D 125/50* (2012.01)
*F16D 125/52* (2012.01)

(52) U.S. Cl.
CPC ...... *F16D 2125/40* (2013.01); *F16D 2125/50* (2013.01); *F16D 2125/52* (2013.01)

(58) Field of Classification Search
USPC ...................................................... 188/72.8
See application file for complete search history.

(56) References Cited

U.S. PATENT DOCUMENTS

| | | | | |
|---|---|---|---|---|
| 8,186,488 | B2 * | 5/2012 | Poertzgen | B60T 13/746 |
| | | | | 188/162 |
| 8,616,346 | B2 * | 12/2013 | No | F16D 65/18 |
| | | | | 188/156 |
| 8,616,348 | B2 * | 12/2013 | Winkler | F16D 65/18 |
| | | | | 188/196 V |
| 8,684,147 | B2 * | 4/2014 | Winkler | F16H 25/2238 |
| | | | | 188/156 |
| 8,790,208 | B2 * | 7/2014 | Poertzgen | B60T 13/741 |
| | | | | 475/149 |
| 9,145,939 | B2 * | 9/2015 | Giering | F16D 65/0006 |
| 9,145,950 | B2 | 9/2015 | Dettenberger et al. | |
| 9,162,662 | B2 * | 10/2015 | Sun | B60T 13/746 |
| 9,353,811 | B2 * | 5/2016 | Gutelius | F16D 65/18 |
| 9,410,590 | B2 * | 8/2016 | Jang | H02K 7/116 |
| 9,441,691 | B2 * | 9/2016 | Kong | F16D 65/18 |
| 9,500,240 | B2 * | 11/2016 | Fuse | F16D 65/18 |
| 9,528,563 | B2 * | 12/2016 | Balz | F16D 65/18 |
| 9,689,443 | B2 * | 6/2017 | Hayashi | F16D 65/14 |
| 9,835,213 | B2 * | 12/2017 | Li | F16D 65/0006 |
| 9,835,214 | B2 * | 12/2017 | Son | F16D 55/226 |
| 10,001,182 | B2 * | 6/2018 | Zhang | F16D 65/16 |
| 10,024,375 | B2 * | 7/2018 | Son | F16D 65/0006 |
| 10,030,727 | B2 * | 7/2018 | Sim | F16D 65/183 |
| 10,208,819 | B2 * | 2/2019 | Haustein | B60T 13/741 |
| 10,288,135 | B2 * | 5/2019 | Li | B66B 19/00 |
| 10,316,915 | B2 * | 6/2019 | Sala | B60T 13/74 |
| 2010/0122877 | A1 * | 5/2010 | Kim | F16D 65/18 |
| | | | | 188/72.8 |
| 2014/0034430 | A1 * | 2/2014 | Fuse | F16D 65/18 |
| | | | | 188/72.4 |
| 2014/0034432 | A1 * | 2/2014 | Bull | B60T 13/741 |
| | | | | 188/106 R |
| 2014/0090933 | A1 * | 4/2014 | Sakashita | F16D 55/226 |
| | | | | 188/72.4 |
| 2015/0175143 | A1 | 6/2015 | Sun et al. | |
| 2015/0210253 | A1 * | 7/2015 | Qi | B60T 7/085 |
| | | | | 188/162 |
| 2015/0233434 | A1 * | 8/2015 | Hayashi | F16D 65/0006 |
| | | | | 188/72.6 |
| 2016/0327104 | A1 * | 11/2016 | Li | F16D 65/0006 |
| 2017/0082159 | A1 * | 3/2017 | Son | F16D 65/183 |

FOREIGN PATENT DOCUMENTS

| | | |
|---|---|---|
| CN | 102269230 A | 12/2011 |
| CN | 103573871 A | 2/2014 |
| CN | 205403631 U | 7/2016 |
| DE | 10 2010 040 941 A1 | 3/2011 |
| EP | 3 208 227 A1 | 8/2017 |
| KR | 10-2010-0056133 A | 5/2010 |
| KR | 10-2014-0063386 A | 5/2014 |
| KR | 10-1536598 B1 | 7/2015 |
| WO | 2011/076299 A1 | 6/2011 |

OTHER PUBLICATIONS

Office Action issued in Chinese Patent Application No. 201810153583.X, dated Nov. 28, 2019.

* cited by examiner

ELECTRONIC DISC BRAKE

CROSS-REFERENCE TO RELATED APPLICATION

This application claims the benefit of Korean Patent Application No. 2017-0022826, filed on Feb. 21, 2017 in the Korean Intellectual Property Office, the disclosure of which is incorporated herein by reference.

BACKGROUND

1. Field

Embodiments of the present disclosure relate to an electronic disc brake, and more particularly, to an electronic brake system configured to perform a braking function through an operation of a motor.

2. Description of the Related Art

Generally, a brake apparatus is an apparatus for stopping a vehicle such that the vehicle does not move when braked or parked and serves to hold wheels of the vehicle such that the wheels do not rotate.

Recently, an electronic parking brake (EPB) system configured to electronically control driving of a parking brake has been widely used and installed at a general disc brake to perform a function of a parking brake. The electronic disc brake includes a cable puller type electronic disc brake, a motor-on-caliper (MOC) type electronic disc brake, and a hydraulic parking brake type electronic disc brake.

Referring to the patent document of Korean Laid-Open Patent No. 10-2011-0072877 (Jun. 29, 2011), the document relates to a structure of an MOC type electronic parking brake in which a motor configured to generate power is connected to an actuator, torque is increased and transmitted to the actuator and a caliper while a rotational speed of the motor due to the power generated by the motor is reduced using a plurality of gear apparatuses, and thus a braking operation is performed. However, there are problems in that the actuator used in the electronic disc brake generates severe vibration and noise and assemblability and price competitiveness are poor.

RELATED DOCUMENT

Patent Document

Korean Patent Laid-Open No. 10-2011-0072877 (Jun. 29, 2011)

SUMMARY

Therefore, it is an aspect of the present disclosure to provide an electronic disc brake in which structures of components such as a power transmission unit configured to transmit a driving force of a motor, a speed reduction gear unit configured to reduce a rotation force, and the like are improved.

Additional aspects of the disclosure will be set forth in part in the description which follows and, in part, will be obvious from the description, or may be learned by practice of the disclosure.

In accordance with one aspect of the present disclosure, an electronic disc brake includes a disc configured to be rotated with a wheel, a caliper housing configured to operate pad plates installed at both sides of the disc, and an actuator including a piston provided in the caliper housing and configured to press the pad plates to bring the pad plates into contact with the disc, a spindle rotatably installed in the caliper housing to move the piston forward and backward, a motor configured to rotate the spindle, and a speed reduction apparatus configured to transmit a rotational force of the motor to the spindle, wherein the speed reduction apparatus includes a power connecting unit connected to the motor, a bracket provide above the motor and configured to support the power connecting unit, and a speed reduction gear unit configured to sequentially connect the power connecting unit and the spindle.

The speed reduction apparatus may further include a housing configured to accommodate the motor and a cover configured to cover an upper portion of the housing, and a first damper member may be provided between the bracket and the cover.

A second damper member may be interposed between a lower portion of the motor and the housing.

The power connecting unit may include a slave helical gear provided at one end of the power connecting unit and engaged with a master helical gear (38a) of the motor, a worm shaft gear connected to the speed reduction gear unit, and a bearing formed at the other end of the power connecting unit and configured to support the power connecting unit and reduce vibration.

The housing may include a motor accommodation portion on which the motor is seated, and a speed reduction gear installation portion in which the speed reduction gear unit is installed, wherein the housing may be parallel to the speed reduction gear installation portion.

The speed reduction gear unit may include a worm wheel gear engaged with the worm shaft gear, a sun gear configured to be rotated with the worm wheel gear, a plurality of planetary gears engaged with an outer side of the sun gear, a ring gear formed as an internal gear to accommodate the planetary gears, and a carrier configured to rotatably support the planetary gears, installed to be rotated about the same shaft as the sun gear, and configured to output rotational power, wherein the ring gear may be installed in the speed reduction gear installation portion.

A power line configured to supply power may be provided at the motor, and the power line may include a connecting portion connected to a connector and a bent portion configured to connect the connecting portion and the motor.

The connecting portion may include a contact portion in contact with the connector and formed in a rectangular plate form and may allow a connection state to be maintainable even when the motor vertically and transversely moves or rotates.

Since the bent portion may protrude from an upper side of the motor and have a bent "S" shape, the motor may be easily assembled.

Gear teeth of at least one among the master helical gear, the slave helical gear, the worm shaft gear, the worm wheel gear, the planetary gear, and the ring gear may be formed of a synthetic resin such as a plastic.

Angles of gear teeth of the master helical gear and the slave helical gear may be about 30° to 43°.

Angles of gear teeth of the worm shaft gear and the worm wheel gear may be about 30° to 43°.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter embodiments of the present disclosure will be described in detail with reference to the accompanying drawings. Embodiments described below are provided as examples to fully convey the sprite of the present disclosure to those skilled in the art. The present disclosure are not limited to the embodiments described below and may also be implemented as other forms. Parts irrelevant to the description are omitted in the drawings in order to clearly explain embodiments of the present disclosure, and widths, lengths, and thicknesses components illustrated in the accompanying drawings may be illustrated in an exaggerated way for the sake of convenience in the description. Components that are the same are referred to by the same reference numerals in the specification.

Figure 1:
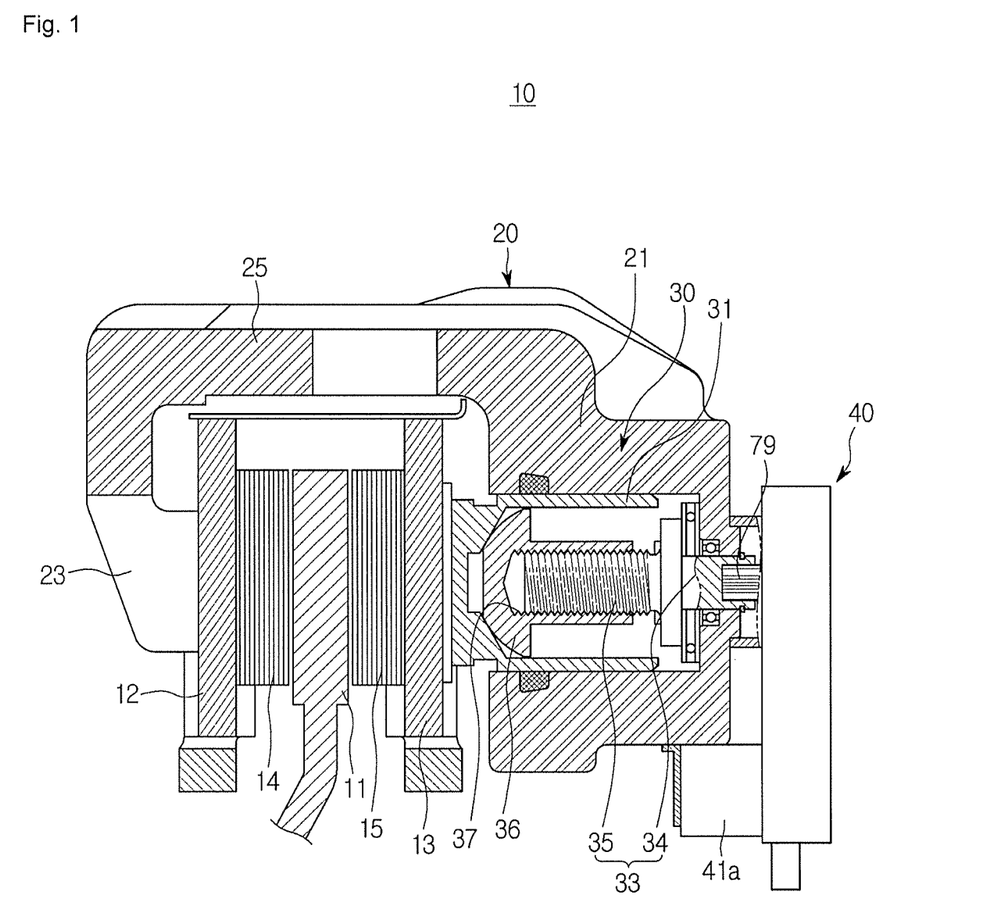
FIG. 1 is a cross-sectional view illustrating an electronic disc brake according to one embodiment of the present disclosure.
Figure 2:
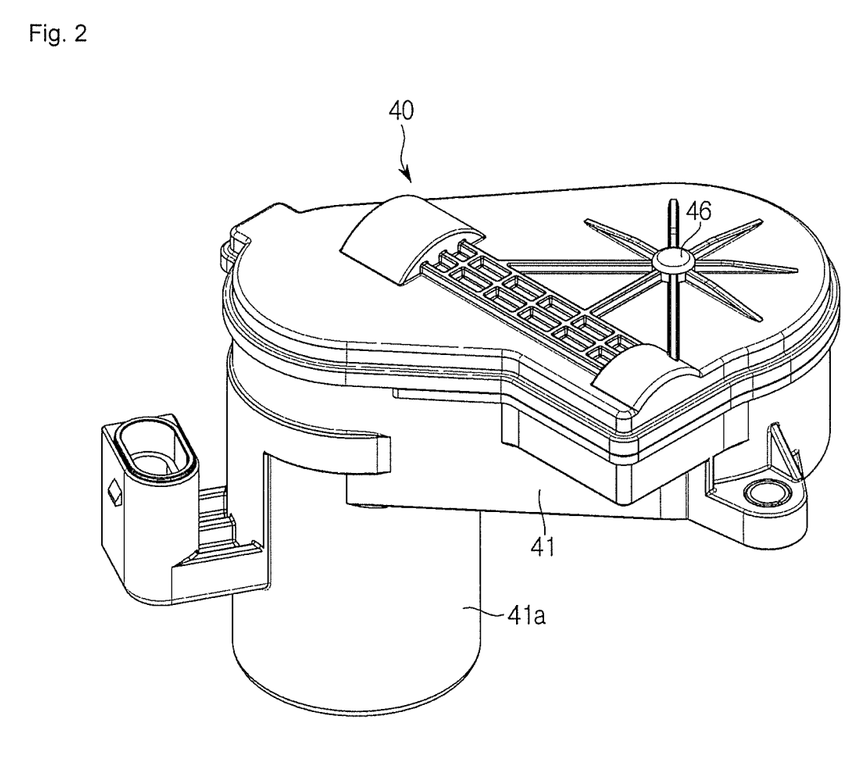
FIG. 2 is a perspective view illustrating a speed reduction apparatus according to one embodiment of the present disclosure.
Figure 3:
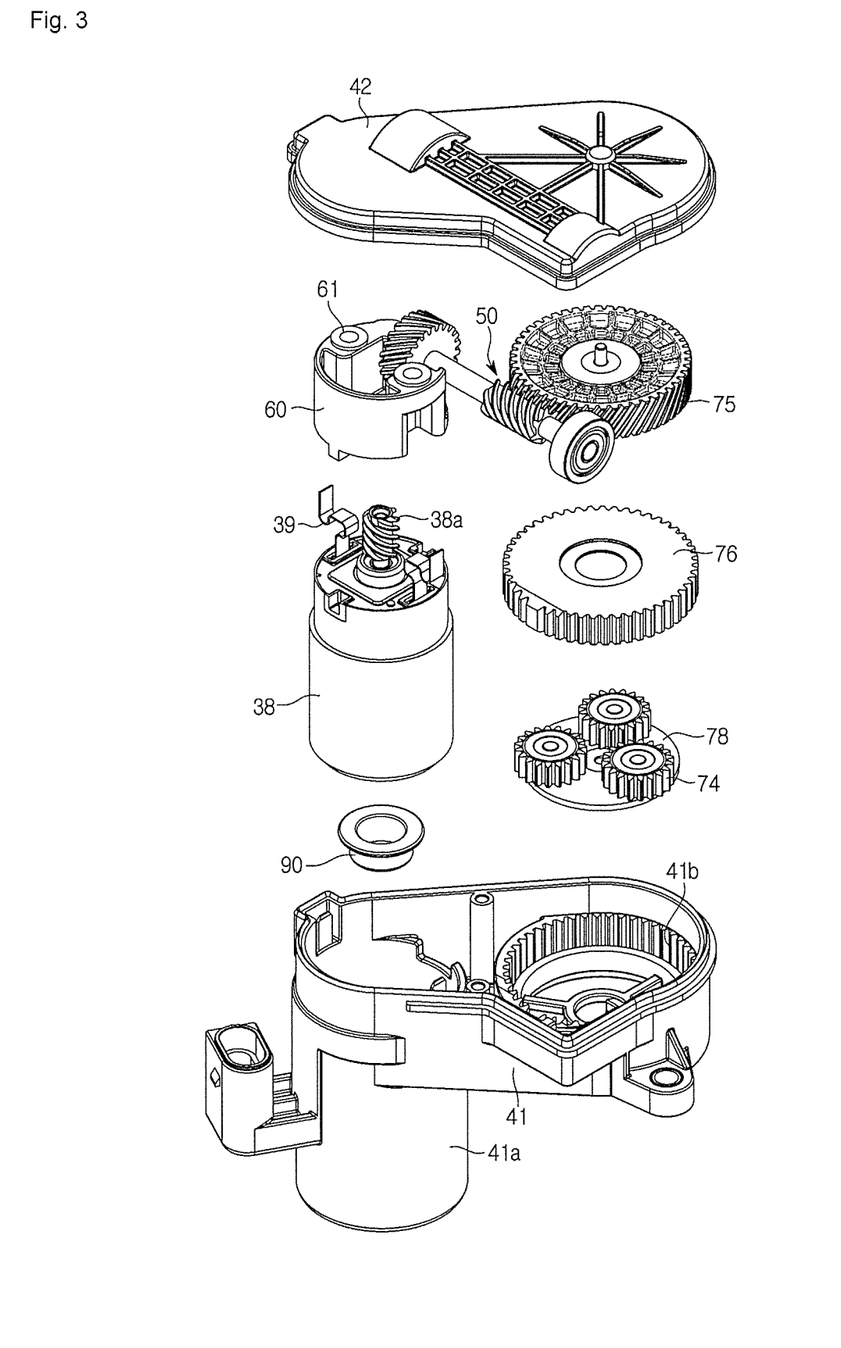
FIG. 3 is an exploded view illustrating the speed reduction apparatus according to one embodiment of the present disclosure.
Figure 4:
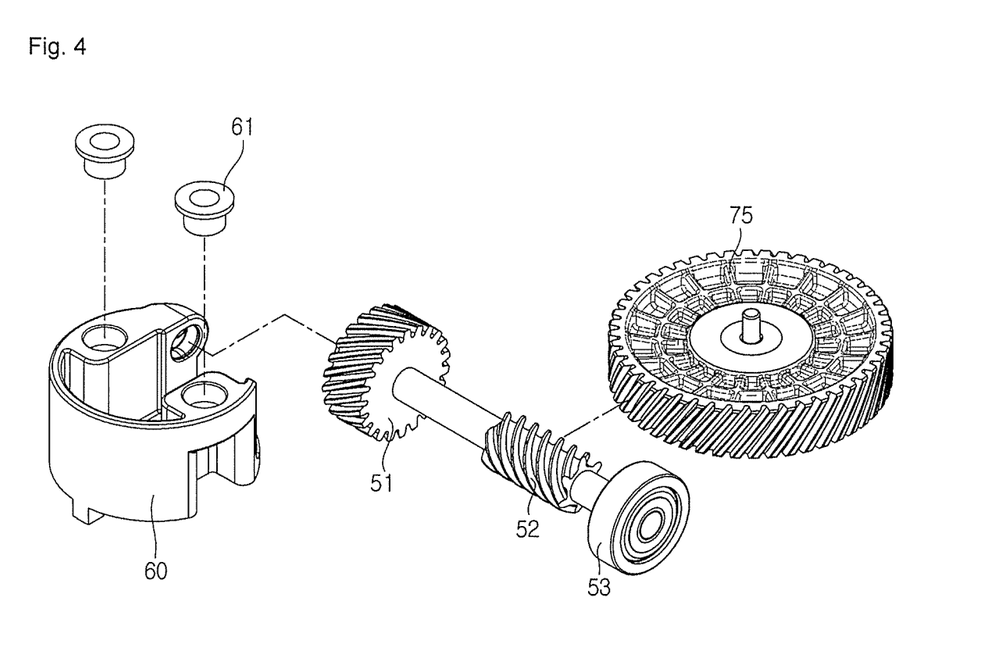
FIG. 4 is a view illustrating a coupling relation of a power connecting unit according to one embodiment of the present disclosure.
Figure 5:
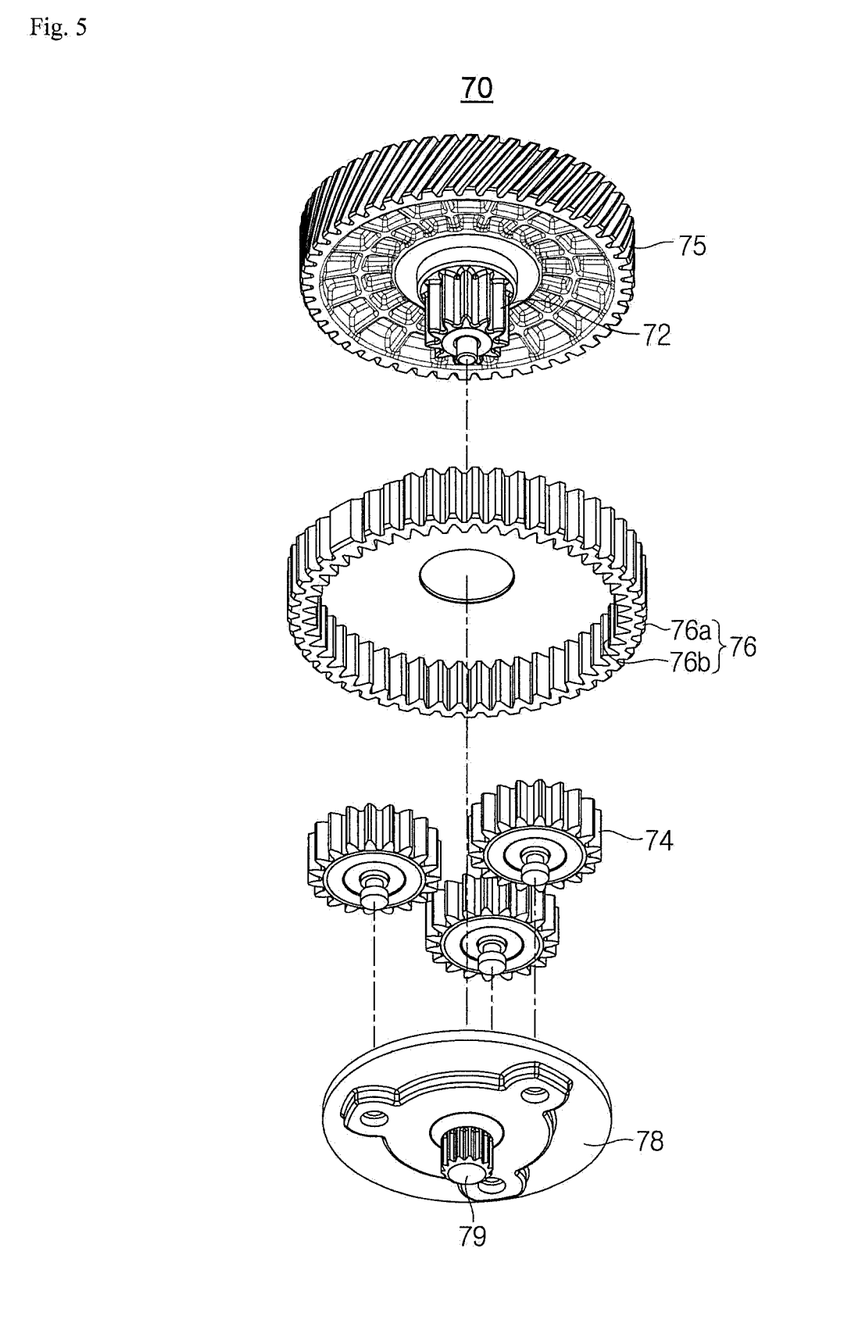
FIG. 5 is a view illustrating a coupling configuration of a speed reduction gear unit according to one embodiment of the present disclosure.
Figure 6:
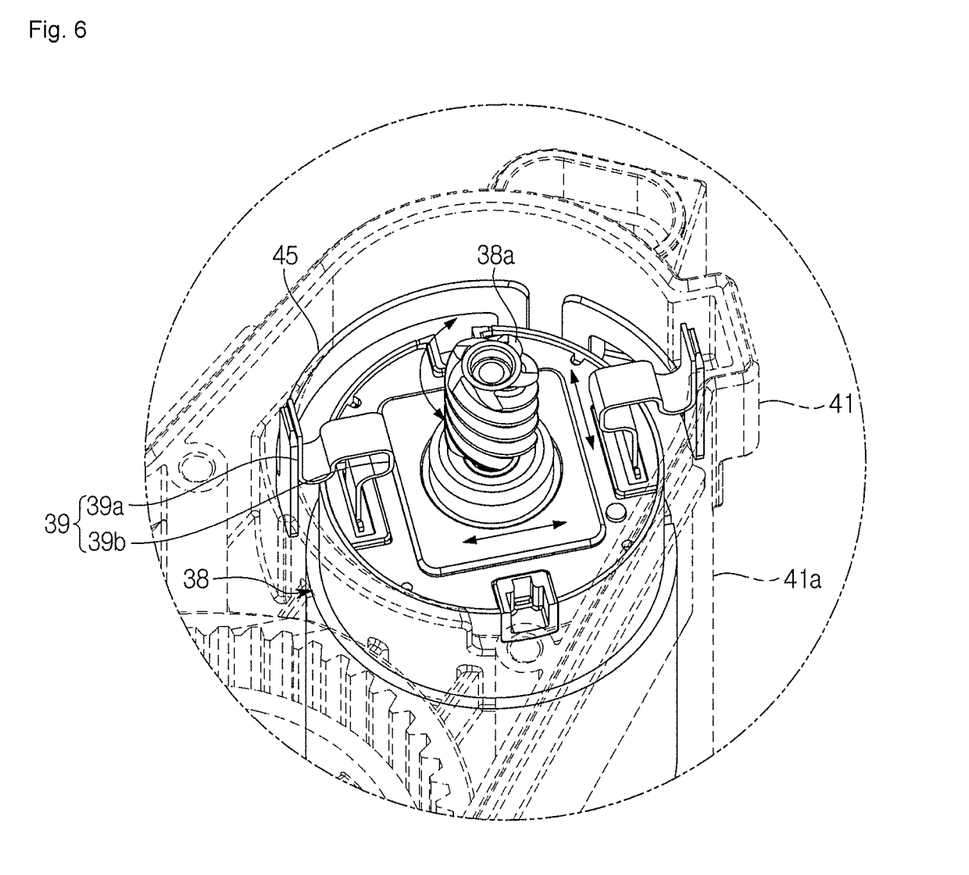
FIG. 6 is an enlarged view illustrating a motor according to one embodiment of the present disclosure.

FIG. 1 is a cross-sectional view illustrating an electronic disc brake according to one embodiment of the present disclosure, FIG. 2 is a perspective view illustrating a speed reduction apparatus 40 according to one embodiment of the present disclosure, FIG. 3 is an exploded view illustrating the speed reduction apparatus 40 according to one embodiment of the present disclosure, FIG. 4 is a view illustrating a coupling relation of a power connecting unit 50 according to one embodiment of the present disclosure, FIG. 5 is a view illustrating a coupling configuration of a speed reduction gear unit 70 according to one embodiment of the present disclosure, and FIG. 6 is an enlarged view illustrating a motor according to one embodiment of the present disclosure.

Referring to the accompanying drawings, an electronic disc brake 10 according to the embodiment includes a disc 11 configured to be rotated with a wheel, a carrier (not shown) in which a pair of pad plates 12 and 13 to which friction pads 14 and 15 are respectively attached are installed to be spaced a predetermined distance apart from each other, a caliper housing 20 slidably installed on the carrier and configured to operate the pad plates 12 and 13, and an actuator 30 including a piston 31 installed in the caliper housing 20 to be movable forward and backward.

The caliper housing 20 is installed on the carrier to be slidable using a pair of guide rods (not shown), and the caliper housing 20 includes a cylinder 21 in which the piston 31 is embedded, a finger portion 23 for operating an outer pad plate 12, which will be described below, and a connecting portion 25 configured to connect the finger portion 23 and the cylinder 21.

The carrier is installed on a knuckle of a vehicle body using a mounting bolt, and the caliper housing 20 is coupled to both end portions of the carrier to be slidable on the guide rods.

The friction pads 14 and 15 are attached to inner surfaces of the pair of pad plates 12 and 13. The pad plates 12 and 13 include an inner pad plate 13 having an outer surface disposed in contact with a front end of the piston 31 and the outer pad plate 12 having an outer surface disposed in contact with the finger portion 23.

The actuator 30 includes the piston 31 slidably inserted into the cylinder 21 of the caliper housing 20, a spindle 33 rotatably inserted into the cylinder 21 of the caliper housing 20, a nut spindle 36 installed inside the piston 31 to press the piston 31 or release pressure thereof while being moved forward and backward by rotation of the spindle 33, the motor 38 for rotating the spindle 33, and the speed reduction apparatus 40 configured to transmit a rotational force of the motor 38 to the spindle 33.

The piston 31 is slidably inserted into the cylinder 21 as described above, and is provided in a cylindrical form in which an inside is recessed in a cup form.

The spindle 33 includes a support 34 provided at a rear end side of the cylinder 21 and rotatably supported and a male screw 35 configured to extend a predetermined length from the support 34 toward an inner center of the piston 31.

The nut spindle 36 is formed in a cylindrical form and includes a female screw 37 provided on an inner surface of the nut spindle 36 and coupled to the male screw 35 of the spindle 33 to be movable forward and backward in an axis direction of the piston 31 by rotation of the spindle 33. Accordingly, when the spindle 33 is rotated in a clockwise or counterclockwise direction, the nut spindle 36 is moved forward or backward to press the piston 31, and thus braking is performed.

The motor 38 receives electrical power through manipulation of a switch (not shown) provided on a driver's seat of a vehicle and converts electrical energy into mechanical rotational kinetic energy. Control of a braking operation according to an operational signal of the switch is performed by an electronic control unit (ECU, not shown) of the vehicle.

In addition, a power line 39 for supplying electrical power is provided at the motor 38 and includes a connecting portion 39a connected to a connector 45 and a bent portion 39b bent in a direction opposite the connecting portion 39a to reduce vibration due to shake of the motor 38.

The connecting portion 39a may be formed in a wide rectangular plate form to maintain a connection state even when the motor 38 rotates and vertically and transversely moves.

Since the bent portion 39b is formed in a bent "S" shape above the motor 38, efficiency of an assembly may be improved. The bent portion 39b has a structure configured to easily insert the motor 38 into the housing 41, and the structure is improved from a power line structure difficult to modify. Here, the bent portion 39b may have the same thickness as the connecting portion 39a.

The speed reduction apparatus 40 further includes the power connecting unit 50 connected to the motor 38, a bracket 60 provided above the motor 38 and configured to support the power connecting unit 50, the speed reduction gear unit 70 configured to sequentially connecting the power connecting unit 50 and the spindle 33, a housing 41 in which the motor 38 is accommodated, and a cover 42 configured to cover an upper portion of the housing 41, and a first damper member 61 is provided between the bracket 60 and the cover 42. Here, a second damper member 90 is interposed between a lower portion of the motor 38 and the housing 41.

The first damper member 61 and the second damper member 90 may be formed of an elastically deformable material so that vibration and noise generated between the bracket 60 and the cover 42 or the motor 38 and the housing 41 may be reduced.

The second damper member 90 is interposed between the lower portion of the motor 38 and a lower surface inside the housing 41 and supports the motor 38 from a motor accommodation portion 41a of the housing 41 such that the motor 38 may be stably accommodated in the motor accommodation portion 41a of the housing 41 without an additional installation structure and tolerances of components which may be generated at the motor 38 and the housing 41 during a manufacturing process may be cancelled.

The housing 41 includes the motor accommodation portion 41a in which the motor 38 is accommodated and a speed reduction gear installation portion 41b for installing the speed reduction gear unit 70 at a side opposite the motor accommodation portion 41a. As illustrated in the drawings, the motor accommodation portion 41a is provided in a circular hollow shape, and the speed reduction gear installation portion 41b has a form engaged with a restriction portion 76a of a ring gear 76. Since the motor accommodation portion 41a and the speed reduction gear installation portion 41b are provided to be parallel to each other, the motor 38 and the speed reduction apparatus 40 may be compactly installed in the cylinder 21 of the caliper housing.

The cover 42 is formed in a box form having an open lower portion such that a space is formed therein when coupled to the housing 41. Since the cover 42 and the housing 41 may be formed of a synthetic resin material, after the power connecting unit 50, the bracket 60, and the speed reduction gear unit 70 are fixedly installed in the housing 41, the cover 42 is welded to the housing 41 through a method such as ultrasonic or laser welding so that an inside of the housing may be easily sealed.

In addition, the connector 45 for electrically connecting the power line 39 of the motor 38 to an external power source is provided at one side of the housing 41, and a shaft protrusion 46 for supporting the axis of a worm gear of the speed reduction gear unit 70 is provided on the cover 42.

The power connecting unit 50 directly connects the motor 38 to the speed reduction gear unit 70 and transmits a rotational force of the motor to the speed reduction gear unit 70. To this end, the power connecting unit 50 includes a slave helical gear 51 provided at one end of the power connecting unit 50 and engaged with a master helical gear 38a of the motor 38, a worm shaft gear 52 connected to the speed reduction gear unit 70, and a bearing 53 formed at the other end thereof and configured to support the power connecting unit 50 and reduce vibration. The power of the motor 38 is transmitted to a worm wheel gear 75 through the slave helical gear 51 and the worm shaft gear 52, and the bearing 53 reduces vibration or an impact generated during the power transmission. Here, one end of the power connecting unit 50 is supported by the bracket 60, and the bearing 53, which is the other end thereof, is supported by the housing 41.

The master helical gear 38a is rotated about a shaft of the motor 38, and the slave helical gear 51 engaged with the master helical gear 38a is rotated about an axis in which a direction of the axis is changed to be perpendicular to the shaft of the motor 38. Noise may be significantly reduced due to a change in a direction of a rotational axis using a helical gear because a contact ratio of the helical gear is better than that of a spur gear, and in a case in which a gear ratio is adjusted, the helical gear may also serve a function of speed reduction.

The worm wheel gear 75 is engaged with the worm shaft gear 52 provided at the other end of the power connecting unit 50, is rotated, and perpendicularly changes a direction of a rotational axis, that is, a direction parallel to the motor 38. The worm wheel gear 75 is firmly supported by the shaft protrusion 46 provided on the cover 42.

Angles of gear teeth of the master helical gear 38a and the slave helical gear 51 may be about 30° to 43°. Through this, efficiency of power transmission through the master helical gear 38a and the slave helical gear 51 may be improved, and noise generated between the gear teeth may be suppressed. Similarly, angles of gear teeth of the worm shaft gear 52 and the worm wheel gear 75 engaged therewith may also be about 30° to 43°.

Meanwhile, the gear teeth of the master helical gear 38a, the slave helical gear 51, the worm shaft gear 52, and the worm wheel gear 75 may be formed of a synthetic resin material such as a plastic. Since the gear teeth through which the gears are engaged are formed of the synthetic resin material such as the plastic, a manufacturing cost of the product is reduced, weight reduction of the product may be realized, and noise generated between the engaged gears when power is transmitted may be suppressed.

The speed reduction gear unit 70 includes the worm wheel gear 75 engaged with the worm shaft gear 52, a sun gear 72 configured to be rotated with the worm wheel gear 75, a plurality of planetary gears 74 engaged with an outer side of the sun gear 72, the ring gear 76 having an engaging portion 76b which is an internal gear to accommodate the planetary gears 74, and a carrier 78 installed to rotatably support the planetary gears 74 and be rotated about the same axis as the sun gear 72 and configured to output rotational power, and the ring gear 76 is installed in the speed reduction gear installation portion 41b. Here, three planetary gears 74 are disposed to surround the sun gear 72.

The sun gear 72 is provided in the worm wheel gear 75. More specifically, an engaging portion engaged with the worm shaft gear 52 is provided on an outer circumference of a large diameter of the worm wheel gear 75, and the sun gear 72 configured to protrude in a shaft direction is provided below the worm wheel gear 75. Accordingly, the sun gear 72 protrudes downward from the worm wheel gear 75, and the planetary gears 74 are engaged with the sun gear 72 and accommodated in a space.

The ring gear 76 is restricted within the speed reduction gear installation portion 41b in an internal gear form and may accommodate the gears 72 and 74 therein. Since the gears 72 and 74 are provided at the same height on the housing 41, the speed reduction apparatus 40 may be compactly and efficiently designed. In addition, since the worm wheel gear 75 is stably supported by the shaft protrusion of the cover 42, twisting between the gears due to prolonged use may be effectively prevented.

The plurality of planetary gears 74 are provided as three gears in consideration of effectiveness and economic feasibility, and are rotatably provided at divided shafts divided from the carrier 78 in three directions.

Meanwhile, an output shaft 79 is provided below the carrier 78, and the output shaft 79 is coupled to the spindle 33 to perform braking.

Here, the speed reduction apparatus 40 will be simply described again below. A rotational force is transmitted to the worm wheel gear 75 while a direction of a rotational axis of the master helical gear 38a of the power connecting unit 50 connected to the motor 38 by the gears is changed by the slave helical gear 51 and a direction of a rotational axis of the slave helical gear 51 is changed again by the worm shaft gear 52 of the power connecting unit 50. The worm wheel gear 75 is connected to the sun gear 72 of the integrally provided speed reduction gear unit 70, the sun gear 72 transmits a rotational force to the output shaft 79 provided at a center of the carrier 78 through the planetary gears 74 engaged with the ring gear 76, and the output shaft 79 of the carrier 78 is finally connected to the spindle 33 of the actuator, reduces the rotational force of the motor 38, and transmits the reduced rotational force to the spindle 33.

Accordingly, the speed reduction apparatus 40 allows the spindle 33 to be rotated at low speed and with high torque while allowing the motor 38, which is a driving source, to be miniaturized. For example, in a case in which operation of the motor 38 is stopped in a state in which braking is performed, as rotation of the spindle 33 is restricted due to a large speed reduction ratio of the speed reduction apparatus 40, a braking state is maintained.

Meanwhile, gear teeth of the plurality of planetary gears 74 and the ring gear 76 may be formed of a synthetic resin material such as a plastic. Since the gear teeth through which the gears are engaged are formed of the synthetic resin material such as the plastic, a manufacturing cost of a product may be reduced, weight reduction of the product may be realized, and noise generated between the engaged gears during power transmission may be suppressed.

Particularly, the power connecting unit 50 having a helical and worm gear form has an advantage in that operation thereof may be performed with reduced noise. In addition, since a speed reduction ratio of a worm gear is large, a compact speed reduction gear unit 70 may be formed without forming a multistage speed reduction gear unit 70. In addition, due to the worm gear connection between the worm wheel gear 75 and the worm shaft gear 52, a phenomenon in which a braking force disappears when a power source of the motor 38 is turned off may be prevented because the worm wheel gear 75 cannot drive the worm shaft gear 52 even though the worm shaft gear 52 may drive the worm wheel gear 75. In addition, as the motor 38 is disposed at a side of the speed reduction apparatus 40 such that a central axis line of the motor 38 and an output shaft line of the speed reduction apparatus 40 are parallel, a total length of the electronic disc brake can be shorter than that of a conventional electronic disc brake.

A braking operation of the electronic disc brake having the above-described structure is performed as follows.

When a driver manipulates a parking switch provided at a side of a driver's seat of a vehicle for performing braking (including parking), the motor 38 rotates. A rotational speed of the motor 38 is reduced by the speed reduction apparatus 40 to rotate the spindle 33 with a large force.

When the spindle 33 is rotated, the nut spindle 36 is moved in a shaft direction thereof, the nut spindle 36 presses the piston 31, and thus braking is performed.

After the braking is completed, the operation of the motor 38 is stopped, and rotation of the spindle 33 is prevented by the speed reduction gear unit 70 having a large speed reduction ratio. Accordingly, the braking state is maintained as long as the motor 38 is not driven again.

When the driver wants to release braking, the driver releases the braking by manipulating the parking switch of the driver's seat. Here, since the motor 38 rotates in a backward direction when braking and the spindle 33 is rotated in the backward direction when braking, the nut spindle 36 presses the piston 31 to release the braking.

As described above, the electronic disc brake according to one embodiment of the present disclosure can reduce noise and improve assemblability using the speed reduction apparatus 40 having a power transmission structure in which the motor 38 is accommodated in the housing 41 and the power connecting unit 50 supported by the bracket 60 is used.

In addition, since a helical gear and a worm gear are used during a power transmission process of the motor 38, a compact size and noise reduction can be effectively realized.

In addition, backward rotation of the spindle of the actuator when a power source of the motor 38 is turned off can be prevented by using a worm gear having a large speed reduction ratio as the speed reduction gear unit 70, and a compact size can be realized by providing the worm wheel gear 75 and the worm shaft gear 52 at the same height.

In addition, since the first damper member 61 or the second damper member 90 is used to form a noise reducing structure, noise can be simultaneously reduced and assemblability can be improved in an assembly direction of the motor 38.

In addition, since the connecting portion 39a formed in a rectangular plate form is provided at the power line 39 of the motor 38 and the bent portion 39b bent in an "S" shape is provided above the motor 38, a connection state is maintained even when the motor 38 moves, and assemblability is also improved.

As should be apparent from the above description, an electronic disc brake according to one embodiment of the present disclosure can reduce noise and improve assemblability using a speed reduction apparatus having a power transmission structure in which a motor is accommodated in a housing and a power connecting unit supported by a bracket is used.

In addition, since a helical gear and a worm gear are used during a power transmission process of the motor, a compact size and noise reduction can be effectively realized.

In addition, backward rotation of a spindle of an actuator when a power source of the motor is turned off can be prevented by using a worm gear having a large speed reduction ratio as the speed reduction gear unit, and a compact size can be realized by providing a worm wheel gear and a worm shaft gear at the same height.

In addition, since a first damper member or a second damper member is used to form a noise reducing structure, noise can be simultaneously reduced and assemblability can be improved in an assembly direction of the motor.

In addition, since a connecting portion formed in a rectangular plate form is provided at a power line of the motor and a bent portion bent in an "S" shape is provided above the motor, a connection state is maintained even when the motor moves, and assemblability is also improved.

While the disclosure has been described with reference to the embodiments illustrated in the accompanying drawings, the embodiments should be considered in a descriptive sense only, and it should be understood that various alterations and equivalent other embodiments may be made by those skilled in the art. Therefore, the scope of the disclosure is defined by the appended claims.

What is claimed is:

1. An electronic disc brake comprising:
   a disc configured to be rotated with a wheel;
   a caliper housing configured to operate pad plates installed at both sides of the disc; and
   an actuator including:
      a piston disposed in the caliper housing and configured to press the pad plates to bring the pad plates into contact with the disc;

a spindle rotatably installed in the caliper housing to move the piston forward and backward;
a motor configured to rotate the spindle; and
a speed reduction apparatus configured to transmit a rotational force of the motor to the spindle,
wherein the speed reduction apparatus includes:
a power connecting unit connected to the motor;
a bracket disposed above the motor and configured to support the power connecting unit;
a speed reduction gear unit having gear teeth and configured to sequentially connect the power connecting unit and the spindle; and
a housing configured to accommodate the motor, and
wherein the housing includes a speed reduction gear installation portion therein having gear teeth to be engaged with the gear teeth of the speed reduction gear unit,
wherein the power connecting unit includes:
a slave helical gear disposed at a first end of the power connecting unit and engaged with a master helical gear of the motor;
a worm shaft gear connected to the speed reduction gear unit; and
a bearing disposed at a second end of the power connecting unit, the bearing configured to support the power connecting unit and to reduce vibration.

2. The electronic disc brake of claim 1, wherein the speed reduction apparatus further includes: a cover configured to cover an upper portion of the housing; and
a first damper arranged between the bracket and the cover.

3. The electronic disc brake of claim 2, wherein a second damper is interposed between a lower portion of the motor and the housing.

4. The electronic disc brake of claim 1, wherein the housing further includes a motor accommodation portion on which the motor is seated,
wherein the speed reduction gear unit is disposed in the speed reduction gear installation portion, and
wherein the housing is parallel to the speed reduction gear installation portion.

5. The electronic disc brake of claim 4, wherein the speed reduction gear unit includes:

a worm wheel gear engaged with the worm shaft gear;
a sun gear configured to be rotated with the worm wheel gear;
a plurality of planetary gears engaged with an outer side of the sun gear;
a ring gear configured to accommodate the planetary gears, as an internal gear; and
a carrier configured to rotatably support the planetary gears, installed to be rotated about the same shaft as the sun gear, and configured to output rotational power,
wherein the ring gear is disposed in the speed reduction gear installation portion to be engaged therewith.

6. The electronic disc brake of claim 4, wherein gear teeth of at least one among the master helical gear, the slave helical gear, the worm shaft gear, the worm wheel gear, the planetary gear, or the ring gear are composed of a synthetic resin.

7. The electronic disc brake of claim 4, wherein angles of gear teeth of the master helical gear and the slave helical gear are 30° to 43°.

8. The electronic disc brake of claim 4, wherein angles of gear teeth of the worm shaft gear and the worm wheel gear are 30° to 43°.

9. The electronic disc brake of claim of claim 1, wherein the motor comprises a power line configured to supply power, and
wherein the power line includes:
a connecting portion connected to a connector inside the housing; and
a bent portion configured to connect the connecting portion and the motor.

10. The electronic disc brake of claim 9, wherein the connecting portion includes a contact portion in contact with the connector and having a rectangular plate shape, and allows a connection state to be maintainable when the motor vertically and transversely moves or rotates.

11. The electronic disc brake of claim 9, wherein the bent portion protrudes from an upper side of the motor and has an "S" shape.

* * * * *